(12) United States Patent
Schmaltz et al.

(10) Patent No.: US 10,796,261 B2
(45) Date of Patent: Oct. 6, 2020

(54) AGRICULTURAL ENTERPRISE MANAGEMENT METHOD AND SYSTEM

(71) Applicant: Decisive Farming Corp., Irricana (CA)

(72) Inventors: Remi Schmaltz, Irricana (CA); Michael Coolidge, Irricana (CA); Garth Donald, Irricana (CA)

(73) Assignee: Decisive Farming Corp., Irricana (CA)

( * ) Notice: Subject to any disclaimer, the term of this patent is extended or adjusted under 35 U.S.C. 154(b) by 163 days.

(21) Appl. No.: 15/773,015

(22) PCT Filed: Nov. 2, 2016

(86) PCT No.: PCT/CA2016/051271
§ 371 (c)(1),
(2) Date: May 2, 2018

(87) PCT Pub. No.: WO2017/075700
PCT Pub. Date: May 11, 2017

(65) Prior Publication Data
US 2018/0322426 A1 Nov. 8, 2018

Related U.S. Application Data

(60) Provisional application No. 62/250,091, filed on Nov. 3, 2015.

(51) Int. Cl.
*G06Q 10/06* (2012.01)
*G06F 16/954* (2019.01)
*G06Q 50/02* (2012.01)

(52) U.S. Cl.
CPC ....... *G06Q 10/0637* (2013.01); *G06F 16/954* (2019.01); *G06Q 50/02* (2013.01)

(58) Field of Classification Search
None
See application file for complete search history.

(56) References Cited

U.S. PATENT DOCUMENTS

| 2014/0278731 A1 | 9/2014 | Griffin et al. |
| 2015/0302305 A1 | 10/2015 | Rupp et al. |
| 2016/0308954 A1 | 10/2016 | Wilbur et al. |

FOREIGN PATENT DOCUMENTS

| CA | 2 663 917 C | 12/2014 |
| CN | 104992309 A | 10/2015 |

OTHER PUBLICATIONS

International Search Report issued in PCT/CA2016/051271 dated Jan. 23, 2017 (2 pages).

(Continued)

*Primary Examiner* — Alan S Miller
*Assistant Examiner* — Arif Ullah
(74) *Attorney, Agent, or Firm* — Osha Liang LLP

(57) ABSTRACT

A computer-implemented cloud-based agricultural enterprise management system and methods. The system comprises a plurality of modular components for receiving and processing data pertaining to agricultural production of commodities by an agricultural producer and for centralizing and storing the received and/or processed data in a single cloud-based database. The producer can provide to one or more third-party suppliers and/or service providers, authorized but restricted access to selected components of their agricultural enterprise management system and cloud-based database so that together, the producer, suppliers and service providers can effectively and cost-efficiently plan and manage the delivery of products and services during a crop production cycle, and the sale of harvested agricultural commodities. Separate modular components may be provided for inputs exemplified by agronomy data, crop production inputs data, crop growth and performance tracking, commodity market data, weather monitoring and forecasting, farm equipment maintenance, enterprise management overhead components.

20 Claims, 6 Drawing Sheets

(56) References Cited

OTHER PUBLICATIONS

Written Opinion issued in PCT/CA2016/051271 dated Jan. 23, 2017 (5 pages).

AGRICULTURAL ENTERPRISE MANAGEMENT METHOD AND SYSTEM

TECHNICAL FIELD

This disclosure relates to computer-implemented methods and systems for managing farm-related commercial transactions. More particularly, this disclosure relates to computer-implemented methods and systems for identifying, evaluating and optimizing options for crop selection, crop rotations, resource allocations, selection of crop production inputs, and application of inputs, risk management, and farm production-related commercial transactions.

BACKGROUND

The size and scope of farming i.e. agricultural production enterprises have been increasing during the last two decades as the producers endeavored to increase productivity while maintaining or reducing their input costs and overhead costs. There is a large assortment of interactive web-based applications ("apps") now available for an agricultural producer to input their annual field-by-field production-related agronomic data for assimilation and correlation with the historical data for the fields, and then for assimilation of the correlated production data with related inputs and/or services data records pertaining to fertility and pest management to provide accurate historical data regarding annual and multi-year revenues and returns-on-investment generated by the different crops that were grown on those fields. The results of such data entries, processing, and reporting are commonly used by the producer to assess crop production options available for an up-coming growing season and to concurrently forecast revenues and profits for each of the crop options based on the historical crop performance of their fields.

Such applications generally used by agricultural producers for selection and assessment of their crop production options for a selected field, are generally based on a decision matrix that incorporates: (i) the producer's preferred crop rotation cycle for each field, (ii) the historical annual production data on that field for each crop option being considered, (iii) current commodity pricing and related futures forecasting for each crop option, (iv) projected input requirements and related costs for each crop option, (v) projections of crop yields correlated over a selected range of input quantities for selected input options e.g., selected fertilizers and pesticides, and (iv) estimation of ranges of potential revenues and profits for each crop option related to the ranges of types and quantities of inputs selected for each crop options. The current agricultural management apps are functionally "reactive" in their operation in that their calculated projections of yields, revenues, and performance efficiencies are based on mathematical processing of and correlations with historical data. Such apps make it possible for producers to monitor the current status of their current crop production cycle with regards to input costs, rates of plant growth and development, for the purpose of predicting yields and associated production costs. These types of apps can now be run on handheld devices such as tablets and smartphones as well as on portable and desktop computers.

Also available are a wide assortment of programs and apps for suppliers of ag-chemical products and services to support their supply planning for upcoming crop production season, for example estimation of the volumes of fertilizer products and pesticide products they need to bring into inventory in order to ensure adequate supplies to service their client base. It is now possible for an agricultural producer to integrate and synchronize one or more of their agronomic apps with a supplier's inventory apps to enable the producer and supplier to coordinate their planning activities and also, to negotiate set pricing for the supply of selected products and services.

Adding to the increasing complexity of managing an agricultural enterprise is the emerging trend of globalization of the commodity markets available for the agricultural producer to sell their harvested products into, and the rapid ripple effects that occur in the commodity markets in response to significant political or weather events and the immediate impacts on real or perceived supply/demand imbalances. Consequently, in addition to using multiple web-based apps to monitor and manage their crop production activities and inputs supplies, many agricultural producers are also using on a regular basis web-based apps for monitoring agricultural commodities markets and futures trading as tools to assist their agricultural production planning and for developing their commodity divesture strategies.

The net consequence of the deluge of web-based apps for inputting and monitoring data associated with agriculture production and commodities markets is that agricultural producers are becoming overwhelmed by the information available to them and by the information directly relating to their farming operations that they need to monitor and track.

SUMMARY

The present disclosure generally relates to a computer-implemented web-based system and related methods for management of a producer's agricultural enterprise. The system disclosed herein generally comprises a plurality of modular components for receiving and processing data pertaining to agricultural production of commodities by the producer and for centralizing and storing the received and/or processed data in a single cloud-based data management platform that is interactive with multiple cloud-based databases.

According to one embodiment, an example of a single cloud-based data management platform comprises: (i) a SaaS platform for hosting a plurality of business software applications for solely for the access and use by a single agricultural producer, and (ii) a PaaS platform for enabling the producer to provide limited and restricted access to some of their databases hosted on their SaaS platform, to selected suppliers and service providers so that the suppliers and service providers can monitor on farm inventories and equipment/facilities records for the purpose of producing for the producer's review and decisions proposals and quotes for the delivery of products and services.

The producer can authorize restricted and authenticated access to their cloud-based agricultural enterprise data management platform, to one or more service providers so that together, they can effectively and cost-efficiently plan and manage the delivery of products and services during a crop production cycle, and the sale and delivery of agricultural commodities produced during the crop production cycle. Separate modular components may be provided for inputs exemplified by agronomy data, crop production inputs data, crop growth and performance tracking, commodity market data, weather monitoring and forecasting, farm equipment maintenance scheduling and tracking, enterprise management components, among others.

The agricultural enterprise methods disclosed herein generally comprise a multiplex of computer-executable programs for aggregating, processing, summarizing, reporting, and storing: (i) the crop performance and yield data inputs received and generated during each crop production cycle, and (ii) data received and generated pertaining to crop inputs and services provided by selected third-party suppliers and service providers. Additionally, the agricultural enterprise management method has a dedicated computer-executable program that authenticates and provides access to selected third-party suppliers and/or service providers under a gateway-controlled user restriction protocol, to enable each supplier or service provider to access one or more modules for the purpose of preparation of proposals and quotes for their products or services for a crop production cycle, for consideration and acceptance or rejection by the agricultural producer. If the agricultural producer accepts a service provider's proposal and quote, a computer-executable program component of the agricultural enterprise management method will generate a work order that will be deliver electronically to the successful third-party supplier or service provider. For example, a work order generated by the agricultural enterprise methods disclosed herein may comprise a single step or alternatively, a series of multiple steps. If a work order has multiple steps, there may also be generated an automated notification in advance of the time for which execution of the step is scheduled. There may also be generated a workflow tracking program to enable real-time monitoring of delivery of the work order steps as they are in progress, and optionally, a a tracking program for post-delivery analysis and summary of the delivery of each step in the work order.

According to another embodiment of the present disclosure, the present agricultural enterprise system and methods disclosed herein provide a screen display in the form of a dashboard wherein each of the data modules is displayed as an icon or alternatively a tab or alternatively a pictogram. According to one aspect, a high-level current status report from a selected data module may be called up by clicking on the pictogram associated with the data module. The current status report may be presented in the form of data associated with a time line, a bar chart, a pie chart, a bullet graph, a sparkline, and the like. According to one aspect, an agricultural producer's agricultural enterprise system is accessible by the producer and by their selected, authorized and authenticated third-party suppliers and producers, as a display on their networked mobile wireless telecommunication computing devices such as exemplified by smartphones, tablets, portable laptop computers, or alternatively, with a desktop computer.

According to another embodiment of the present disclosure, the agricultural producer is able to call up a high level current status report for data in a selected module by clicking on the related pictogram. The producer can then drill down through the raw data, the processed data, the summarized data, the projected data stored in the module by repeatedly clicking on the module's pictogram. Alternatively, the producer may navigate through various levels of granularity (e.g., farm, crop type, field, soil zones, among others) by using a combination of a navigation menu and on-page controls such as tabs, pitograms, and the like. The agricultural enterprise methods disclosed herein may additionally comprise computer-implemented software for performance of push analytics to provide high-level graphic displays of current projections pertaining to crop yields, production costs, returns on investment, related to current crop growth performance and costs incurred data inputs and commodity markets current prices and commodity futures prices. The agricultural enterprise methods disclosed herein may additionally comprise computer-implemented software for performance of SWOT analyses (strength, weakness, opportunities, threats) pertaining to scheduling of product applications such as seeding, spraying, and the like, harvestability scheduling, potential crop yields, and commodity sale pricing that are based on current crop growth performance, production costs-incurred data inputs, commodity markets current prices, and commodity futures prices. The agricultural enterprise methods disclosed herein may additionally comprise computer-implemented software for providing screen alerts for the producer one day, two days, three days, four days, five days, six days, seven days, two weeks, three weeks, four weeks in advance of: (i) a crop management or a crop production event requiring an action by the producer, or (ii) a scheduled delivery of a product(s) and/or a service (s) by a third-party service supplier or provider. The screen alerts may be accompanied by a concurrent audio alert and/or an email notification and/or a push notification to a portable device.

According to another aspect, selected, authorized and authenticated third-party suppliers and service providers are able to access one or more of a producer's modules to which they have received restricted access for, by clicking on the related pictogram for a selected module to receive a high-level current status view of the products and/or services they have been contracted to provide to the agricultural producer for the current crop production cycle. A third-party supplier or service provider may be able to access more detailed current and/or historical data pertaining to their past deliveries and scheduled future deliveries. The agricultural enterprise methods disclosed herein may additionally comprise computer-implemented software for providing screen alerts for the third-party supplier or service provider one day, two days, three days, four days, five days, six days, seven days, two weeks, three weeks, four weeks, in advance of a scheduled delivery of a product(s) and/or a service(s). The screen alerts may be accompanied by a concurrent audio alert and/or an email notification and/or a push notification to a portable device.

Another embodiment of the present agricultural enterprise methods disclosed herein is the incorporation at least two separate sets of modelling algorithms that integrate and then correlate and further model the mathematical processing of each of the current and historical data sets for each of the modules comprising the agricultural enterprise system, to enable delivery to the agricultural producer's dashboard display enable realtime high-level push analytics updates on the current crop production status relative to global weather patterns, global commodity market fluctuations based on current supply and demand data, coupled with risk identification and analysis.

BRIEF DESCRIPTION OF THE DRAWINGS

The present disclosure will be described in conjunction with reference to the following drawings in which.

DETAILED DESCRIPTION

Figure 1:
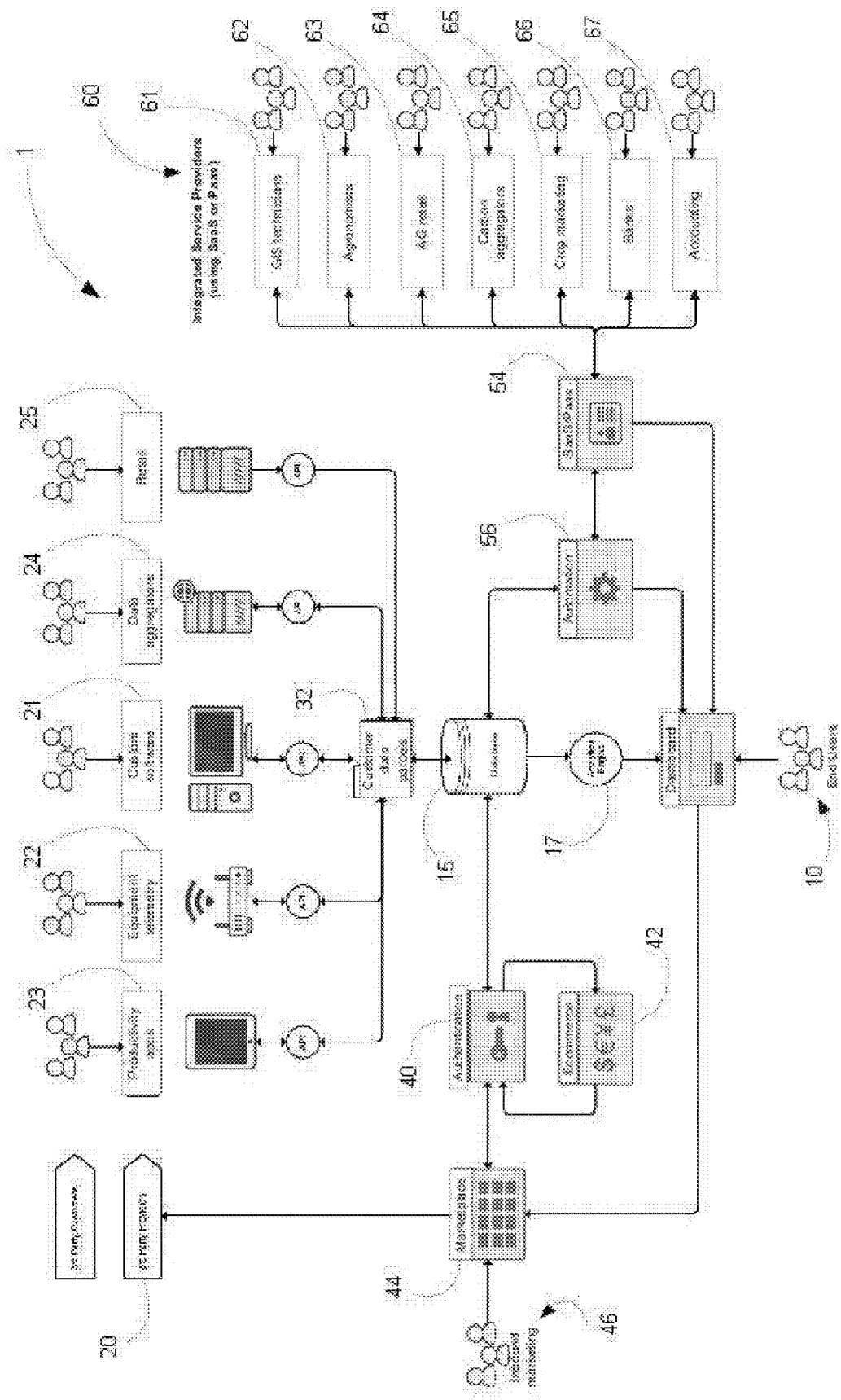
FIG. 1 is a diagrammatic illustration of one embodiment of a method disclosed herein for capturing, processing, managing and outputting data relating to an agricultural enterprise, and for controlling access and use of the output data by third-party service providers.

The embodiments of the present disclosure generally relate to computer-implemented methods and a related system for agricultural enterprise management by an agricultural producer wherein all of annual data collected and/or generated, on a year-to-year basis, that pertain to the producer's: (i) farmlands' physicochemical and topographical characteristics, (ii) pre-sowing crop production planning and crop selection processes, (iii) actual crops produced on each of the individual fields comprising the farmlands, (iv) crop production inputs used to optimize a selected crop's growth, development, and productivity on each of the individual fields, (v) agronomy services engaged prior to and during the crop production cycle, (vi) crop yields harvested from each of the individual fields, (vii) sales and revenue-generated data for harvested crops, (viii) overhead expenditures incurred to produce each crop on each field and for managing the entire farmlands operation during a production cycle, (ix) financing of costs related to acquisition of the individual fields, acquisition of capital equipment, crop production costs, costs related to storage of harvested crops, delivery of harvested crops to purchasers, inventory records, and sales records relating to the harvested crops, (x) enterprise-related insurance costs, (xi) enterprise management overhead costs, (xii) production cost analyses and return-on-investment data, (xiii) lists of service providers, (xiv) weather data, (xv) commodity market performance relating to the grower's crops during the crop production cycle plus one cycle or two cycles or three cycles of monthly or annual commodity market performance specifically pertaining to the selected crops, are consolidated and centralized into a single database.

All of the data collected and/or processed and/or generated and/or summarized and/or reported during an annual crop production cycle for each of the afore-mentioned categories are referred to herein as an annual data set, while each of the individual data sets collected and/or processed and/or generated and/or summarized and/or reported for each of the afore-mentioned categories are referred to herein as a data subset. Previously collected and/or generated annualized historical data for a producer's agricultural enterprise can be inputted or imported into the agricultural enterprise management system disclosed herein for use in correlating and assessing costs, performance efficiencies, revenues, and returns-on-investment for each of the afore-mentioned categories, over selected periods of multiple crop production cycles.

According to one embodiment of the present disclosure, the consolidated annual data and data subsets collected, generated, summarized, reported with the agricultural enterprise management computer-aided methods and stored in a database component of the related system disclosed herein, are accessible and easily searched or manipulated by the agricultural producer or a service provider using a networked mobile wireless telecommunication computing device exemplified by smartphones, tablets, portable laptop computers, or alternatively, a desktop computer. The annual data and data subsets input into the system or which are alternatively generated by the computer-implemented methods, are provided as a "dashboard display" on the producer's networked computing device wherein each of the afore-mentioned categories is displayed as an individual pictogram. Pictograms are commonly referred as computer icons. The agricultural enterprise management methods and system disclosed herein enable an agricultural producer to consolidate the inputting, processing, analyzing, summarizing and reporting all of the annual agronomic data, data pertaining to purchase and application of crop inputs products and services, crop production and yield data, commodity market performance relating to the grower's crops, crop inventory and sales data, and other key crop production data in a single application, to assist the grower in their annual crop planning, their management of the crop production activities, and sales of their harvested crops.

According to another embodiment of the present disclosure, the agricultural producer may make available to selected third-party service providers and inputs providers on a restricted individual case-by-case basis using a gateway-controlled restriction protocol, access to one or of the data modules described herein. An authorized third-party service provider would have "read-only" access are alternatively, a mix of read-only access and read/write access to the crop production planning data module and additionally, to the historical data and data subsets in modules authorized by the producer, that directly relate to the services and/or products that they provide or alternatively wish to provide to the agricultural producer during the producer's crop production planning activities, managing their current crop production, storage, marketing and delivery of their harvested crops and/or other agricultural products. The authorized third-party service provider would then be able to provide the producer with a selection of options for the products and services that could be provided for the up-coming crop production season or cycle. If the producer chooses to proceed with one of the options proposed by the authorized third-party service provider, the methods and system disclosed herein will generate and save a related work order in the module and forward a copy of the work order to the authorized third-party service provider. A work order could list for example (i) a description of the product and/or service to be delivered, (ii) a date or alternatively, a list of dates for delivery of the product and/or service, (iii) pricing for the delivered product and/or service, (vi) online electronic payment options for selection and use by the producer, with payment verification, (v) completion confirmation section for confirming that the delivered product and/or service and the date(s) of delivery, (vi) comments section for entries by the producer and/or the authorized third-party service provider pertaining to the product and/or service and their delivery. A work order may optionally include a selection of predefined steps for inclusion of the delivery of services, and the formation of automated workflow patterns whereby a customizable workflow map may be created around the steps a service provider selects for inclusion for a selected producer.

Unless defined otherwise, all technical and scientific terms used herein have the same meaning as commonly understood by one of ordinary skill in the art to which the invention belongs. Certain terms are discussed in the specification to provide additional guidance to the practitioner in describing the methods, uses and the like of embodiments of the invention, and how to make or use them. It will be appreciated that the same thing may be said in more than one way. Consequently, alternative language and synonyms may be used for any one or more of the terms discussed herein. No significance is to be placed upon whether or not a term is elaborated or discussed herein. Recital of one or a few synonyms or equivalents does not exclude use of other synonyms or equivalents, unless it is explicitly stated. Use of examples in the specification, including examples of terms, is for illustrative purposes only and does not limit the scope and meaning of the embodiments of the invention herein. To facilitate understanding of the disclosure, the following definitions are provided.

As used herein, the term "ag retailer" means any retail organization that supplies producers with: (i) products such as seed, nutrients, agrichemicals, crop protection products, feed, equipment and technology, and (ii) services such as seed, nutrients, crop protection products, feed, equipment and technology.

As used herein, the term "agrichemicals" means any of chemical fertilizer products, hormones, growth agents, insecticides, herbicides, fungicides, nematicides, and the like.

As used herein, the term "agronomic prescription" means a mapping of variable rate fertilizer application to an individual field based on soil testing results and the fertility requirements for a selected crop to be grown on the field. An agronomic prescription may additionally include agronomic prescriptions for types and timing of pesticide applications to be made during the crop production cycle.

As used herein, the term "Agronomy Calculator" means an embodiment of the present disclosure that pertains to a method and system for determining variable rate fertilizer requirements for fields comprised of one or more management zones.

As used herein, the term "agronomy services" means services provided by an unrelated third-party service provider to the agricultural producer, pertaining to technical data and/or advice regarding an individual field and or the farmlands regarding the physicochemical condition of the individual field(s), and/or to crop production options for each of the individual fields and/or to crop development performance during a crop production cycle. Agronomy services may include one or more of and are exemplified by variable rate fertilizer prescription maps, seed prescription maps, fungicide prescription maps, production zone management, benchmark soil sampling, in-season soil testing, fertility planning, nutrient management, manure management, multi-year crop rotation planning, herbicide rotation planning, crop variety planning and selections, seeding rate calculations and recommendations, GPS field mapping, crop scouting, plant tissue analyses, seed analyses, planting timing, weed management, insect management, disease management, irrigation management, swath timing, harvest timing, record keeping, yield targets and estimates, cost-of-production analyses, risk and tolerance analyses, and the like.

As used herein, the term "capital investment" means money used to purchase a fixed asset such as land, fixed-in-place machinery and/or equipment, rolling machinery and/or equipment, buildings, and the like.

As used herein, the term "costs of sales" means all of the direct costs incurred by the agricultural producer to produce and harvest a crop from an individual field during a crop production cycle. Direct costs may include the cost of seeds, starting plant material, juvenile livestock, juvenile poultry, crop production inputs exemplified by fertility products, feed, pesticides, labor hired for sowing, application of fertility and/or pesticide products, harvesting, fuel costs for equipment to work an individual field during a crop production cycle, agronomic service fees, and the like.

As used herein, the term "crop production" means all of the activities associated with planning, planting, growing, harvesting, and all related management activities for a crop selected for an individual field for a growing cycle. For most grain crops, fruit crops, berry crops, crop production occurs once on an annual basis. For biomass crops such as hay, alfalfa and the like, crop production may occur twice or three times or four times on an annual basis. Depending on the types of products delivered to market, dairy production, poultry production and the like may occur on a daily basis, a weekly basis, a monthly basis, a multi-monthly basis, an annual basis. Depending on the types of products delivered to the market, livestock production may occur on a monthly basis, a multi-monthly basis, an annual basis, or a multi-year basis.

As used herein, the term "dashboard display" means a single page web-based real-time user interface displaying on a mobile wireless telecommunication computing device and/or a desktop computer, a series of links or tabs or pictograms that are linked to the modular data input components described herein for showing graphical presentation of the current and historical data and data subsets residing within the modules that may be filtered and/or navigated using a content search field based on defined query string parameters. The user interface may be designed to display the data and data subsets in relation to geo-spatial maps and/or as colorful summaries and/or graphics exemplified by bar charts, pie charts, bullet graphs, sparklines and the like.

As used herein, the term "driver" means a a selectable function specific to one of the selected nutrients, resulting in an automated calculation of fertilizer rates according to a predefined set of nutrient requirement rates for the selected crop type.

As used herein, the term "enterprise-related insurance" includes property insurance, crop insurance for risks exemplified by weather, hail, drought, frost damage, insects, disease, and the like, equipment insurance for risks exemplified by damage and/or liabilities resulting from accidents, mechanical failures, credit insurance for risks associated with sales of crops.

As used herein, the term "farmlands" means all of an agricultural producer's land used for crop production exemplified by grain production and biomass production and/or livestock production and/or dairy production and/or poultry production and/or fruit production and/or berry production.

As used herein, the term "fertilizer rate" means a specified rate of straight fertilizer product(s) and/or blended fertilizer product(s) to be applied to a specific management zone in the field.

As used herein, the term "straight fertilizer product" means any product, natural or manufactured, designed to deliver a specific amount of one or more nutrients to a plant.

As used herein, the term "blended fertilizer product" means a combination of straight fertilizer products, conventionally represented by a guaranteed analysis As used herein, the term "guaranteed analysis" means a ratio of nutrients delivered through a blend of multiple fertilizer products.

As used herein, the term "individual field" means one discreet plot of land with defined cultivated borders.

As used herein, the term "manual" means a selectable function specific to one of the nutrients, resulting in a manual entry or adjustment of fertilizer rates.

As used herein, the term "nutrient requirements" means a set of calculated values of actual nutrient required to achieve a specific yield. Nutrient requirements as discussed herein are based on: (i) available soil testing data for a specific zone in a field as delineated by a geospatial fertility map, or (ii) agronomic nutrient requirements for the crop being grown, or (iii) predefined yield goal for a selected zone.

As used herein, the term "overhead costs" means all costs related to the ongoing costs associated with operating and managing the agricultural enterprise. Overhead costs may include land rental fees, debt service fees, line-of-credit fees, electricity, heating, other utilities, fuel, building maintenance and repairs, equipment maintenance and repairs, insurance, taxes, financial services such as book-keeping fees, accounting fees, and the like, legal services, travel, telecommunications equipment and fees, and other types of miscellaneous costs that are not directly attributable to the cost of producing a product during a crop production cycle.

As used herein, the term "PaaS" means a "platform as an enterprise service" a computing platform, typically including operating system, programming language execution environment, database, and web server for use by service providers for integrating their software with the agricultural producer's SaaS platform without the cost and complexity to the agricultural producer of having to buy and manage the suppliers' underlying hardware and software layers.

As used herein, the term "physicochemical characteristics" means the physical properties and characteristics in combination with the chemical composition of the top layers of soil within an individual field. The top layer of soil may may have a depth of up to one metre from the soil surface.

As used herein, the term "products applied" means a listing of one or more prescribed ag-chemical products (fertilizers and/or pesticides) that were applied at specified rates of application at selected times on a selected field in accordance with an agronomic prescription or a task.

As used herein, the term "SaaS" means a "software as an service" delivery model for a plurality of business software applications exemplified by office and messaging software, database management system software, business management software, accounting software, collaboration software, customer relationship management, management information systems, enterprise resource planning, service desk management software, invoicing software, human resource management software, payroll processing software, and the like.

As used herein, the term "satellite imagery" means visual images recorded by devices carried in space by satellites above the earth's atmosphere, and includes high resolution near-infrared imagery, far-infrared imagery, multispectral imagery, hyperspectral imagery, panchromatic imagery, light detection and ranging (LIDAR) imagery, digital elevational model (DEM) imagery, and the like. It is to be noted that the scope of the present disclosure encompasses high resolution anal imagery captured by recording devices deployed within the earth's atmosphere, wherein the recording devices are carried by airplanes or drones.

As used herein, the term "scouting" means the process of regularly monitoring a selected field for the purpose of precisely detecting and assessing the occurrence of crop pests (i.e., diseases and insect infestations), and for selection and recommendation of suitable pest and disease control interventions. "Scouting" as used herein also includes the process of regularly monitoring a selected field for the purpose assessing crop growth and development for estimation of potential crop yields, and for assessment if whether or not an agronomic prescription should be prepared in order to improve crop growth and development.

As used herein, the term "Scouting Task Module" means a user interface (also referred to herein as "UI") that tracks and reports on the status of all tasks. The "Scouting Task Module" allows service providers (or producers) to complete the following actions for one or more selected tasks: (i) review scouting reports, (ii) create agronomic prescriptions, (iii) record related details including dates of applications, application rates, and weather conditions, and (iv) indicate task completion and date of completion, and (v) deletion of active and of completed tasks as appropriate.

As used herein, the term "service provider" means a third-party that provides services on a fee basis pertaining to one or more aspects of the agricultural enterprise. Non-limiting examples of service providers include ag retailers, agronomic services providers, crop sowing contractors, fertilizer application service providers, pesticide application service providers, crop scouting service providers, harvesting service providers, crop hauling and delivery service providers, equipment dealerships, equipment maintenance and repair service providers, weather and weather forecasting services, financial services, accounting services, insurance services, telecommunications and internet services, commodity brokering services, and the like.

As used herein, the term "service provider means any individual or organization that is qualified to provide to agriculture producers, consultative services such as crop scouting, soil testing, field mapping, custom planting and application and development of nutrient management and conservation plans, financial advice or services, or crop marketing advice or trade execution services.

As used herein, the term "task" means a designated workflow pertaining to a specific selected field and which is initiated by one of: (i) the submission of a scouting report, (ii) the creation of an agronomic prescription for the selected field (without the prior submission of a scouting report), or (iii) a recording of "applied products" in situations wherein a scouting report is not available and an agronomic prescription for the selected field has not been created.

As used herein, the term "topographical" means the three-dimensional vertical and horizontal profile of an individual field and can be characterized by the changes in elevation and slope and orientation to the earth's magnetic field (i.e., north, south, east, west compass points).

An example of an agricultural enterprise management system disclosed herein generally comprises a single cloud-based data management platform that is interactive with multiple cloud-based databases, and is accessible with a variety of mobile wireless telecommunication computing devices exemplified by smartphones, tablets, portable laptop computers, smart watches, smart glasses, wearable devices, or alternatively, with desktop computers. The agricultural enterprise management system comprises a plurality of modules for inputting crop planning production data inputs for processing and analysis by the methods disclosed herein for the purposes of aiding in selection of a crop for production on a selected individual field from the farmlands, for generating an agronomic prescription for the individual field, for generating one or more related work orders for transmittal to one or more suppliers and/or service providers, for monitoring crop growth and development performance data during the crop production cycle, for performing SWOT analyses and risk assessments prior to and during the crop production cycle, for monitoring commodity market prices and use of such data for calculating revenue projections and return-on-investment forecasting.

An agricultural enterprise management system according to the present disclosure may comprise data input modules pertaining to:

(i) agricultural production data collected on an individual latitude and longitude within a field for multiple cropping cycles including sowing, spraying, top dressing, irrigation, and harvesting dates, crop types sown, yield target, yield data, environmental data regarding temperatures, precipitation, moisture, wind, and sunlight hours throughout each cropping cycle;

(ii) multiple cropping cycle records pertaining to variable zone-based agronomic prescriptions for optimized production of selected crops in selected agricultural fields, based on correlations of selected satellite imagery with soil sample analyses, agronomic prescriptions, historical crop production records, and historical weather data;

(iii) agrichemical input records and costs for each annual cropping cycle wherein the agrichemicals are characterized by crop, chemical type, chemical manufacturer or blender, soil characteristics, major nutrients and minor nutrients;

(iv) an agronomic calculator comprising agronomic formulae for processing of soil physicochemical data and/or satellite imagery correlatable to the soil physicochemical properties of a selected farmland field or fields;

(v) work order entry and tracking module for an authorized service provider to generate a dedicated inventory of a product and/or a service for delivery to the producer, tracking of the delivery progress, and confirmation of delivery, and alternatively, for generating an order for an agronomic service or a technical service, delivery of the agronomic service or technical service, and a report summarizing the service delivered. Alternatively, the work order entry and tracking module may be used by the producer to initiate a work order that is then delivered to one or more selected producers;

(vi) inventory records and management for crops held on-farm, and optionally, electronic sensors for monitoring inventories of selected inputs and/or agricultural commodities produced and held in on-farm storage;

(vii) historical data pertaining to commodity demands, volumes delivered, and pricing;

(viii) real-time feeds of commodity market pricing on an hourly and/or daily and/or monthly basis correlated with valuation of the producer's market position and current outstanding contracts for margin tracking;

(ix) crop sales and return-on-investment (ROI) data on a cropping cycle basis;

(x) risk identification, assessment, and management modules for (a) crop production, and (b) commodity markets (supply and demand);

(xi) equipment inventory, maintenance and operations costs, and performance efficiency tracking;

(xii) User authentications authorizing access to third-party software, for the purpose of either automated or manually initiated transfer of data.

(xiii) a plurality of predictive modelling algorithms for performance of real-time "what if" analyses prior to and during a crop production cycle to facilitate production management decisions to respond to global weather events and/or economy fluctuations;

(xiv) a plurality of algorithms for assimilating outputs from the above components into dashboard summaries of "key performance indicators" (KPIs) that provide high-level snapshots of real-time crop production performance with "SWOT" (strength-weakness-opportunity-threat) analyses during a crop production cycle, to enable management decisions to modify crop management activities in order to optimize production outputs and revenues captured; and optionally (xiv) a farm data and service marketplace module wherein the sale, exchange, collection and connection of all farm data sets are input into a single database or multiple inter-connected databases wherein the individual data sets can be combined with other relevant data sets exemplified by soil, annual weather, and market information data sets that are directly related to the producer's farmlands.

An embodiment of the present agricultural enterprise management system 1 is shown in FIG. 1 and generally comprises a cloud-based database 15, a plurality of modules 20 for receiving certain specific types of data inputs wherein the data inputs are processed and summarized and consolidated in an outputs module 32. The processed data may be further analyzed by a number of computer-executable analytics programs 17 and the results displayed on a screen format 12 accessible by the agricultural producer 10, in the form of a dashboard with multiple pictograms related to the individual modules 21, 22, 23, 24, 25 comprising the plurality of modules 20. Access to the producer's 10 cloud-based database 15 and the outputs module 32 is available to third parties 46, 60 selected by and authorized by the producer 10 via a gateway-controlled restriction protocol and authentication portal 40. The producer 10 may make access available to some third parties 46 who may be potential clients for the producer's products, to the producer's marketplace module 44. The producer may make access available to their cloud-based database 15 and the outputs module 32 via a gateway-controlled restriction protocol and authentication portal 40 to some third parties 60 who may be suppliers of crop production inputs or alternatively service providers exemplified by GIS technicians 61, agronomists 62, retailers of agricultural input products 63, carbon aggregators 64, crop marketing representatives 65, financial institutions 66, accounting services 67, and the like. The agricultural enterprise management system 1 additionally comprises a computer-implemented component 56 for generating agronomic prescriptions and related workorders that are transmitted electronically to selected suppliers and/or service providers, and which are accessible by the selected suppliers and/or service providers via the gateway-controlled restriction protocol and authentication portal 40. Additionally, the agricultural enterprise management system 1 additionally comprises a computer-implemented ecommerce component 42 for receiving payments from the producer's customers for the agricultural products they have purchased, and for making payment to the producer's suppliers for crop production inputs ordered by and delivered to the producer, and to the producers service providers for the services ordered by and delivered to the producer.

Figure 2:
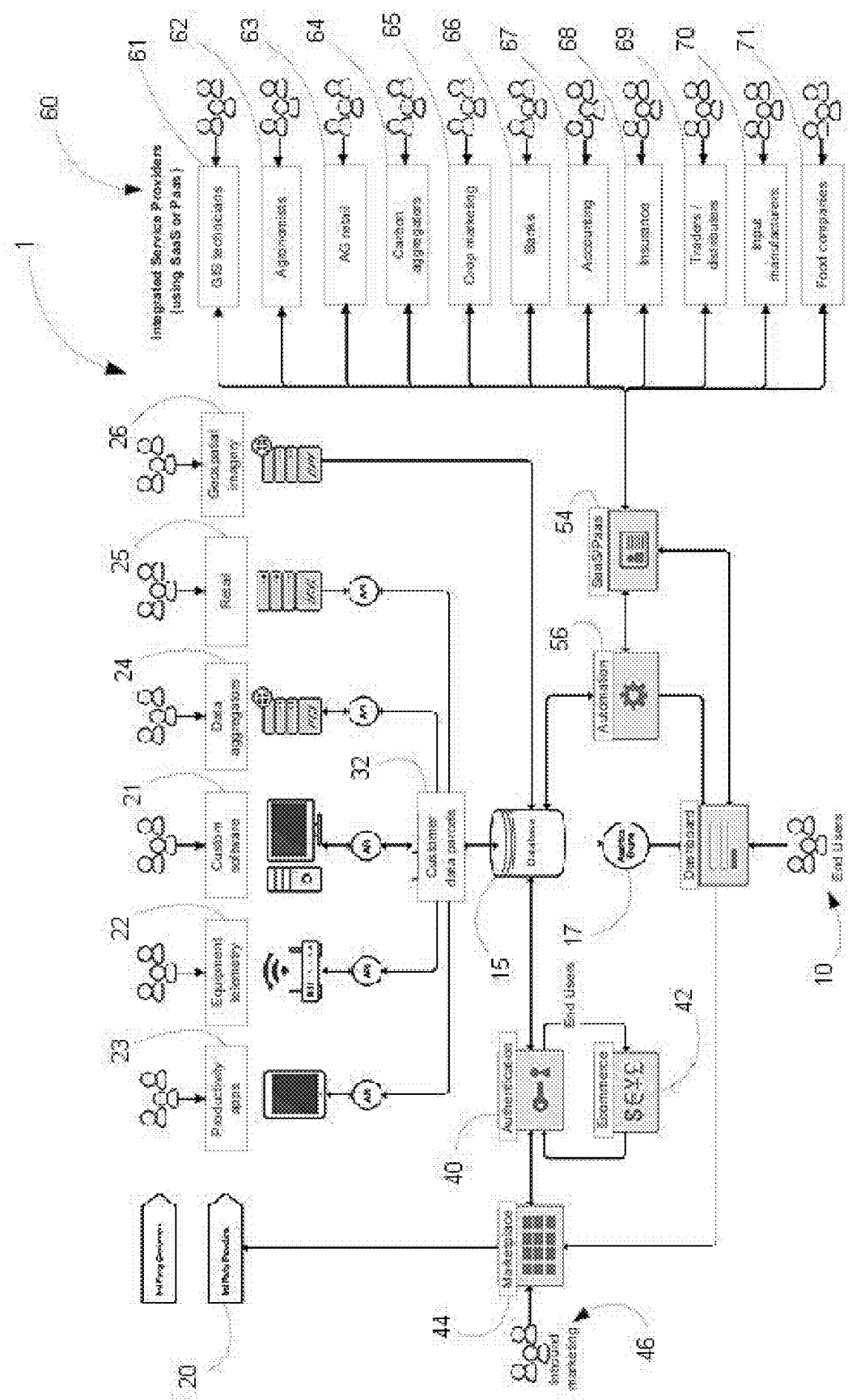
FIG. 2 is a diagrammatic illustration of another embodiment of a method disclosed herein for capturing, processing, managing and outputting data relating to an agricultural enterprise, and for controlling access and use of the output data by third-party service providers.

The agricultural enterprise management system 1 shown in FIG. 1 can be expanded by integration of additional data input modules, for example geospatial imagery 26 (FIG. 2) and/or by addition of more suppliers and service providers such as insurance agencies 68, wholesale distributors 69, manufacturing companies 70, food processors 71, and the like (FIG. 2).

In summary, the agricultural enterprise management system and methods disclosed herein aggregates in a single computer-implemented system the many services used by an agricultural producer prior to and during a crop production cycle, and post-harvest marketing and delivery of the agricultural products to the producers' customers. The present system and methods provide the capability for consolidating, processing, analyzing, assessing, and summarizing a producer's current production data with their historical production data. The producer's crop production data and their crop planning data can be made available to selected third-party suppliers and service providers via a gate-control, restricted and authorized basis to enable the suppliers and service providers to assess the producer's needs for crop input products and crop production services, and to provide cost/benefit analysis-based supply and/or service proposals for the producer's consideration. The present agricultural enterprise management system and methods will then generate agronomic prescriptions and work orders to selected suppliers and service providers, and additionally generate alerts for the producer and the selected suppliers and service providers to ensure that the ordered products and services are timely delivered.

Another embodiment of the present disclosure generally relates to a method and system for determining variable rate fertilizer requirements for fields comprised of one or more management zones. The present method and system for determining variable rate fertilizer requirements disclosed herein is referred to as an "Agronomy Calculator" module. According to one aspect, the Agronomy Calculator module uses available soil testing data, geospatial zone delineation (if available), and predefined agronomic crop needs and yield goals to produce a first set of nutrient requirements as a starting point, to which fertilizer rate calculations can be applied, as will be described in more detail below. According to another aspect, the Agronomy Calculator module may provide agronomists with a standardized workflow interface for automatically calculating and updating fertilizer rates wherein a mix of straight and blended fertilizer products are to be applied to the field using one or more selected fertilizers as the driver of fertilizer rate calculations for all management zones in the field. According to another aspect, the Agronomy Calculator module allows for existing agronomic prescriptions, including any specified driver functions to be applied as a template for subsequent fields, where fertilizer rates are automatically calculated based on the nutrient requirements of a selected field. According to another aspect, the Agronomy Calculator module may be incorporated into and cooperate therewith the present agricultural enterprise management system according to the present disclosure. According to another aspect, the Agronomy Calculator module may be configured for use as a stand-alone app for use with a producer's computers and mobile devices, third-party suppliers' computers and mobile devices, third-party service providers' computers and mobile devices.

The Agronomy Calculator module generally relate to methods for efficiently creating agronomic prescriptions. Some of the features of the present Agronomy Calculator module include: (i) automation of the calculation of fertilizer product requirements in relation to predefined nutrient requirements, (ii) automatic updating of nutrient requirements based on adjustments to the fertilizer rates and/or product inclusions, (iii) automation of the calculation of fertilizer rates for any combination of straight and blended fertilizer products in relation to a baseline set of nutrient requirements, (iv) an ability to add-in micronutrient fertilizers to the guaranteed analysis and/or agronomic prescription. Other features of the Agronomy Calculator module include a reduction in data entry requirements pertaining to: (v) updates to crop yield goals, crop nutrient requirements or fertilizer rates for an existing agronomic prescription or for an agronomic prescription in development, (vi) a selected fertilizer product used as a driver of fertilizer rate calculations thereby resulting in automated updating of related fertilizer inputs and actual nutrient calculations, (vii) use of a fertilizer product for manual calculation of fertilizer rates resulting in automated updating of related fertilizer inputs selected as drivers and updating of all actual nutrient calculations, and/or (viii) an agronomic prescription is required for subsequent fields and a previously created agronomic prescription is to be used. Other features of the present Agronomy Calculator module include: (ix) sequential workflow controls for the calculation of fertilizer rates where a combination of fertilizer products are being used, (x) sequential workflow processes that are easier for users to understand and repeat, and (ix) sequential workflow processes that allow flexibility for a user to navigate to previous steps within the processes in order to make adjustments, while retaining any input sources that were previously defined by the user whereby the calculated fertilizer rates and nutrient requirements are updated as changes are made. The present Agronomy Calculator module has the flexibility to specify a guaranteed analysis (i.e. nutrient ratio made available through a combination of fertilizer products) wherein a single nutrient source may be selected as the "driver" for the overall calculation of fertilizer rates for one or more management zones, according to the specified guaranteed analysis in relation to the starting nutrient requirements for a selected crop. The present Agronomy Calculator module has the flexibility to add a second guaranteed analysis wherein a second nutrient source may be selected as the "driver" for the overall calculation of fertilizer rates according to the specified guaranteed analysis, in relation to the original nutrient requirements and in consideration of the first guaranteed analysis. The present Agronomy Calculator module has the flexibility to add one or more straight fertilizer products, wherein a specified fertilizer product may be selected as the "driver" for the overall calculation of fertilizer rates according to the fertilizer product composition, in relation to the original nutrient requirements and in consideration of the first guaranteed analysis. The present Agronomy Calculator module has the flexibility to modify auto-calculated fertilizer rates by switching to a manual function wherein a single nutrient source was previously selected as the "driver" of the overall calculation of fertilizer rates. Furthermore, the present Agronomy Calculator module has the ability to save a particular configuration of products and drivers so that it may be applied to agronomic prescriptions for other fields.

It is to be noted that the exemplary Agronomy Calculator module disclosed herein may form an integral component of the agricultural enterprise management system and methods disclosed herein and may be accessed, for example, by way of a pictogram 23 on a module 20 accessible by an agronomist service provider (FIGS. 1, 2). However, it is within the scope of the present disclosure for the present Agronomy Calculator module disclosed herein to be configured as a stand-alone app for creation and development of agronomic prescriptions by an agronomist for their clients without having to access and/or use another agricultural enterprise management system and methods.

Another embodiment of the present disclosure generally relates to a method and system for managing crop health with a data management platform supporting automated processes and workflows for field scouting, for development of agronomic prescriptions, and for the scheduling and delivery of various types of product applications. This method and system is referred herein as a "Scouting Task Module".

Producers, agronomists and other service providers, and ag retailers require an effective means of managing the complete cycle of scouting fields, creating and receiving agronomic prescriptions, and confirming products applied (for various reasons, including: inventory management, compliance reporting, agronomic management). Current problems for the producer with scouting services available to them is that the use of non-standardized scouting methods, analysis, and reporting makes it difficult them to clearly detect, understand, and take steps to address the occurrence of a crop production anomaly in order to ensure that optimal crop yields are achievable. The use of digital technologies is becoming increasingly prevalent during scouting activities to improve the efficiency of early detection of the occurrences of diseases and insect pests. However, adequate user management frameworks and automated workflow processes are not available for integration into crop production management systems and methods.

According to one aspect, the Scouting Task module provides the ability for a user to prepare a single agronomic prescription for multiple fields requiring the same treatment for example an application of a fertilizer product and/or a pesticide and the like, which then results in the updating of multiple workflows associated with the field and the task. This feature provides a significant reduction of the time required of an agronomist in the preparation of agronomic prescriptions.

According to one aspect, the Scouting Task module comprises a software application (i.e., a series of process steps) for entry of scouting observations made for a selected field at a specified time period, and concurrently enables viable interactions with one or more prescriptions prepared for the selected field, and further concurrently enables the real-time recording of product applications to and within the selected field.

According to another aspect, the Scouting Task module may be incorporated into the present agricultural enterprise management system as exemplified in FIGS. 1 and 2 for restricted access by users with permissions, for example, producers, service providers such as agronomists and crop scouts, and ag retailers, to: (i) monitor the status of existing workflows for one or more selected fields, wherein the workflows relate to scouting reports, agronomic prescriptions, fertilizer products applied, pesticide products applied and the like, (ii) prepare agronomic prescriptions for one or more selected fields independent of or alternatively, based on existing scouting reports, (iii) input records of fertilizer products and pesticides applied independent of or alternatively, based on existing agronomic prescriptions, and (iv) input completion of task workflows.

According to another aspect, the Scouting Task module enables a user to commence or terminate a workflow for a selected field to begin at any point in the above-mentioned stages (i)-(iv), and for the workflow to be tracked as a unique task for a selected field.

According to another aspect, the Scouting Task module additionally comprises a standard process, referred to herein as a "prescription calculator" to enable a user to specify multiple agrichemicals and application rates for each of the agrichemicals for a selected field or group of fields in the form of a single agronomic prescription, which thereby allows calculation of total product requirements for each of the specified agrichemicals.

According to another aspect, the Scouting Task module can be used remotely by the producer or a service provider on a mobile device for example a smart phone, a tablet, a laptop computer, and the like, for on-site or off-site recording of scouting observations for a selected field that can then be uploaded to the present agricultural enterprise management system as exemplified in FIGS. 1 and 2 for access by users with requisite permissions. The scouting observations input in the Scouting Task module may be used for preparation of a task report within the Scouting Task module that can also be uploaded to the present agricultural enterprise management system for access by users with requisite permissions. The Scouting Task module may additionally comprise a notification function to alert other selected users with requisite permissions to the agricultural enterprise management system, that a new scouting task report has been uploaded, and optionally, to send an electronic copy of the scouting task report to one or more selected users.

A producer will be able to use the Scouting Task module in a single integrated system to manage the complete cycle of scouting of all of the selected fields, to create agronomic prescriptions for each of the selected fields based on the scouting task reports, and to confirm that all of the agrichemical products and agronomic services specified in the agronomic prescriptions are delivered in a timely fashion as scheduled. The producer may use the Scouting Task module to assign selected operators, field scouts, other service providers, and ag retailers to specific selected tasks specified in an agronomic prescription for a selected field or fields. Furthermore, a producer may use the Scouting Task module to monitor and confirm that the specified tasks in an agronomic prescription are delivered and/or performed on schedule and as specified. The producer may also use the Scouting Task module to prepare historical detailed and summary reports for each crop production cycle whereby such reports are available for review, reference, and comparison in future crop cycles.

A service provider may use the Scouting Task module for efficient collection and recording field scouting information for the purposes of preparing and forwarding scouting reports to the producer (for example, by uploading scouting task reports to the present agricultural enterprise management system and/or by sending an electronic copy to the producer and other users with the requisite permissions). Likewise, the service provider may also prepare and forward an agronomic prescription for treatment of any identified crop production anomaly of crop health issues to the producer and other users with the requisite permissions. A service provider may also monitor and edit the scouting task reports for the purposes of quality control/assurance and/or data accuracy, prior to or after uploading the scouting task reports to the present agricultural enterprise management system. A service provider may also use the Scouting Task module to notify the producer and other users with requisite permissions of prescribed products, the total volumes of prescribed products, and schedules for their applications based on the new scouting task reports to address crop production or health issues identified during a field scouting event.

Ag retailers and other product suppliers with the requisite user permissions optionally use the Scouting Task module for product inventory control and supply management to ensure sufficient stock is on hand and delivered for application as prescribed on a timely basis.

According to another embodiment, the agricultural enterprise management system can communicate with the producer, third-party suppliers, third-party service providers, pieces of equipment or the database by any suitable wireless communication technique. For example, the system can communicate through cellular communication technology or satellite communication technology. It is to be understood that the various pieces of equipment used the producer's agricultural enterprise may incorporate the appropriate hardware, e.g., transmitters, receivers, amplifiers, etc., and/or software to enable effective communication for the wireless technology implemented in the piece of equipment.

According to an embodiment of the present disclosure, the producer's computers and mobile devices, third-party suppliers' computers and mobile devices, third-party service providers' computers and mobile devices, and computers associated with the producer's various pieces of equipment can include the appropriate user interfaces, monitors, displays or other associated equipment or software to enable a producer or their suppliers or their service providers to interact with the agricultural enterprise management software, database, and system.

Embodiments within the scope of the present disclosure include computer-implemented program products having machine-readable media for carrying or having machine-executable instructions or data structures stored thereon. Machine-readable media can be any available non-transitory media that can be accessed by a general purpose or special purpose computer or other machine with a processor. By way of example, machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It is important to note that the construction and arrangement of the present disclosure as shown in the various embodiments, is illustrative only. Certain features and embodiments have been shown and described in the present disclosure and many modifications and changes may occur to those skilled in the art, values of parameters, mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Furthermore, in an effort to provide a concise description of the embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

EXAMPLES

Example 1. Selection of a Crop for Production During the Next Growing Season

Crop production planning typically commences during the winter approximately three to four months to spring sowing activities. Exemplary interactive steps that a producer may undertake with the agricultural enterprise management system disclosed here include first preparing a historical report summarizing crop production on a selected field. The historical report may span 5 yrs, 8 yrs, 10 yrs, 12 yrs, 15 yrs, 20 yrs and selected periods therebetween. The historical report may include some or all of the following parameters:

type of crop including variety and seed treatment (if any);

total crop yield goals and actualizations on an annual basis;

cost of production, optionally broken out by cost of seed, cost of fertility inputs, cost of pesticide inputs, agronomic consulting and scouting costs, cost of fuel, labor costs for seeding, inputs applications, harvest, and the like;

overhead management costs and capital depreciation;

revenues generated from sales of each of the harvested crops and/or execution of financial positions on an annual basis; and net profits generated from each of the crops on an annual basis.

The historical report may optionally include market price data for other crop types that were not grown crops to enable "what if" analyses determine if an alternative crop had been produced and sold instead of the actual crop that was produced for one or more selected years in the historical report.

The present agricultural enterprise management system enables a producer to parse the historical data records that were input into his database modules during each crop production cycle for (i) agricultural production data; (ii) variable zone-based agronomic prescriptions; (iii) agrichemical input records and costs for each annual cropping cycle; (vii) data pertaining to commodity demands, volumes delivered, and pricing; (ix) crop sales and ROI data; using (xiii) the plurality of algorithms for assimilating outputs from the above components into dashboard summaries of "key performance indicators" (KPIs); and (xiv) the farm data and service marketplace module wherein the sale, exchange, collection and connection of all farm data sets were input into, to produce the historical report. The historical data may be correlated with real-time feeds of world supply and commodity market pricing to assess the "next year" potential harvested value of each crop option. The producer would then be able to use (vii) a plurality of predictive modelling algorithms for performance of real-time "what if" analyses facilitate production management decisions to respond to global weather events and/or economy fluctuations, or rank the ROI potential for each crop option being considered to enable a final decision on selection of a crop for production. After a crop has been selected for production, participating service providers directly involved with related work orders can be alerted on a scheduled basis to confirm delivery of selected products and services.

Example 2. Estimation and Sourcing of Fertility Inputs for Production of a Selected Crop After a crop has been selected for production on a selected field, by a producer generally using the agricultural enterprise management system as outlined in Example 1, the agricultural enterprise management system enables a producer to use the (ii) module for variable zone-based agronomic prescriptions with the (iv) agronomic calculator module for processing of soil physicochemical data and/or satellite imagery to determine the types and amounts of fertility inputs that are required for optimal production of the selected crop. The producer may choose to source time-selected satellite imagery from a source that previously supplied such satellite images. Alternatively, the producer may choose to submit a tender to two or more providers of satellite imagery for the purposes of improving the quality of images delivered for use in variable zone-based agronomic prescriptions module (ii) and agronomic calculator module (iv) and/or to reduce the cost of the imagery. The producer may also choose to source soil sampling and physicochemical analyses from a previous supplier of such services or alternatively, submit a tender to two or more providers of soil testing services. It should be noted that the agricultural enterprise management system may be configured for the producer to give authorization to a selected provider of satellite imagery and/or a selected provider of soil testing and analyses services, to directly upload or transfer their data into the producer's databases.

After the satellite imagery and soil test results have been delivered and input into the variable zone-based agronomic prescriptions module (ii) and agronomic calculator module (iv), the agronomic calculator (iv) is used to process and correlate the soil physicochemical data and satellite imagery to determine the types and quantities of soil fertility inputs required to produce the selected crop on the selected field and input this data into the agrichemical input records module (iii). This process is repeated for each of the producer's fields to determine the total volumes of fertility inputs required for the upcoming production season. Also included is the creation of an equipment data file on a field-by-field basis, which may be supplied to the producer via electronic transfer to the producer's equipment software and otherwise be made available for download using the system interface.

The producer can then request quotes from one or more suppliers of the fertility input products. If the producer wishes, they can provide authorization to the one or more suppliers to limited access to the agrichemical input records module (iii). The one or more suppliers may input their quotes into the agrichemical input records module (iii). After the producer selects the supplier for the fertility inputs, the work order entry and tracking module (v) will then generate a work order itemizing the volumes and delivery dates for the individual fertility products ordered, and then will electronically deliver the work order to the supplier. The work order entry and tracking module (v) will then provide to the supplier reminders of delivery dates and confirmations of deliveries made, and based on electronic inputs and entries made during product delivery, and then during subsequent product withdrawal from storage and distribution onto the field, will monitor product inventories and generate inventory usage and storage reports. Alternatively, the supplier may integrate the fertility requirements data and other relevant datasets such has field and crop production data with their CRM programs (customer-relationship management).

Figure 3:
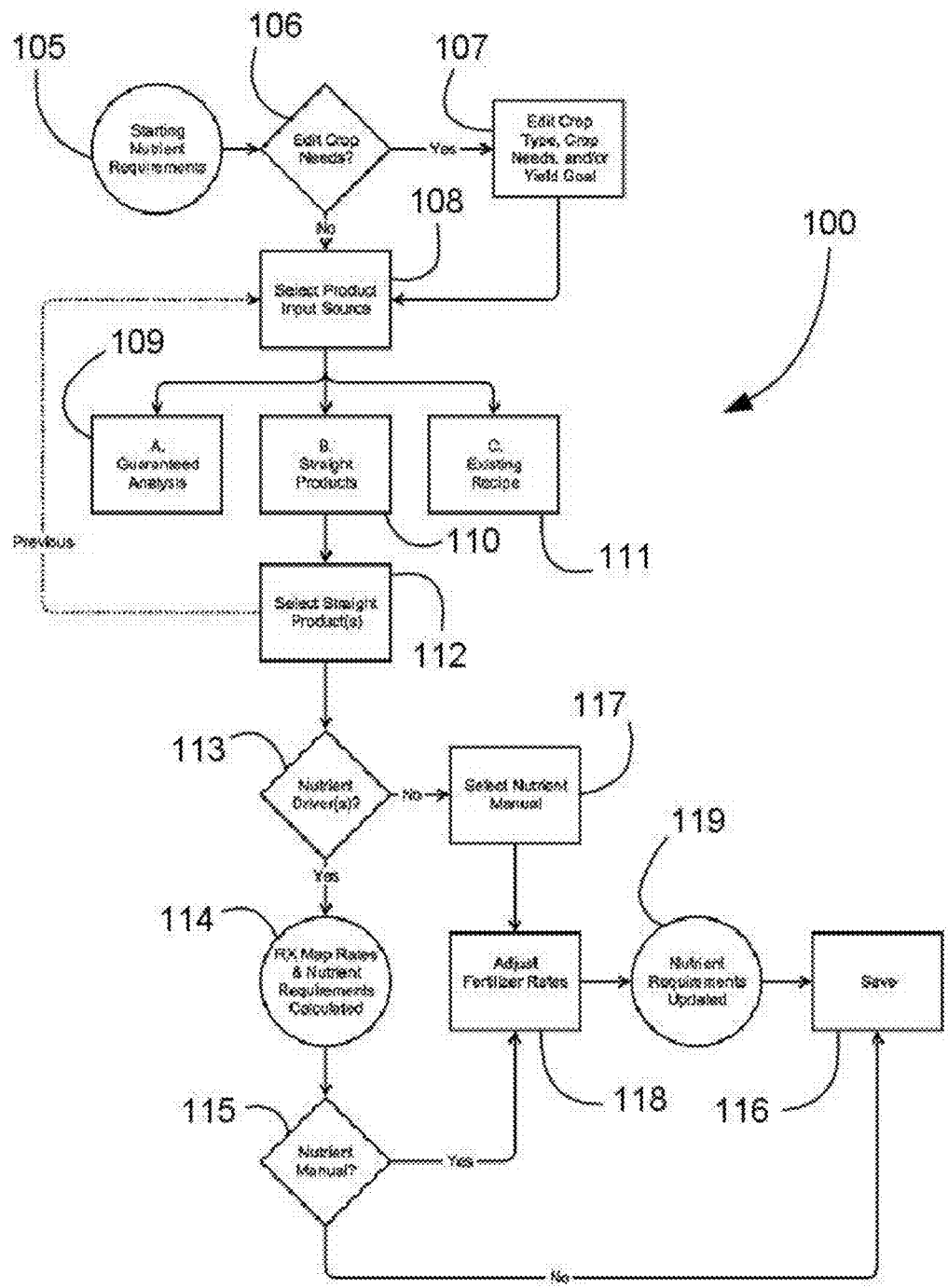
FIG. 3 is a diagrammatic illustration of an exemplary Agronomic Calculator method disclosed herein, used for creation of an agronomic prescription for application of a straight fertilizer product to a selected crop on a selected field.

Example 3. Use of the Agronomic Calculator to Create an Agronomic Prescription that Uses One Straight Fertilizer Product An agronomist may use an example of the Agronomic Calculator 100 to create an agronomic prescription for application of a straight fertilizer product to a selected crop on a selected field by generally following a process illustrated in FIG. 3. First, the agronomist uses an interface control of the Agronomy Calculator to create a new agronomic prescription. Then, the agronomist may review for a producer's field location, the information input by the producer pertaining to the starting fertility information 105 for the field and the geospatial zones therein, the selected crop type and related nutritional needs 107, and any edits to the crop needs 106 input by the producer. The agronomist then would enter the "select production input source" 108 and would select the "B. Straight Products" 110 option (other options available for selection at this step include "A. Guaranteed Analysis" 109 and "C. Existing Recipe" 111). For each nutrient, the agronomist can select a straight fertilizer product from a menu of available straight fertilizer product choices. In this example, the agronomist chooses the straight fertilizer product "11-52-0" from the products menu for the nutrient phosphorus (P). From the P "Function" menu, the agronomist would then select "Driver" 113, as it is desirable that the P component (52, in the case of 11-52-0) of the selected fertilizer product drives the overall fertilizer rates (in accordance with the starting requirements). The fertilizer rates are then automatically updated 114, based on the definitions supplied by producer in the previous step (i.e., selection of the crop type, yield goal, crop needs, and field location). At the same time, the nutrient requirements associated with the crop needs are automatically updated 114. If the agronomist is satisfied with the agronomic prescription generated by the calculations 114 (i.e., the fertilizer rates calculated to satisfy the calculated nutrient requirements), they would proceed by selecting "Save" 116 to save the agronomic prescription. However, if the agronomist was not satisfied with the agronomic prescription generated by the Agronomic Calculator, they would proceed by manually adjusting the fertilizer rates 118, after which, the Agronomic Calculator would recalculate the fertilizer rates and nutrient requirements 119, and then the agronomist would click "Save" 116 to save the agronomic prescription. On the other hand, if the agronomist wishes to manually specify the rate of a selected straight fertilizer product, at the P "Function" driver step 116, they would select "Nutrient Manual" 117, then manually adjust the fertilizer rates 118, after which, the Agronomic Calculator would recalculate the fertilizer rates and nutrient requirements 119, and then the agronomist would click "Save" 116 to save the agronomic prescription.

Figure 4:
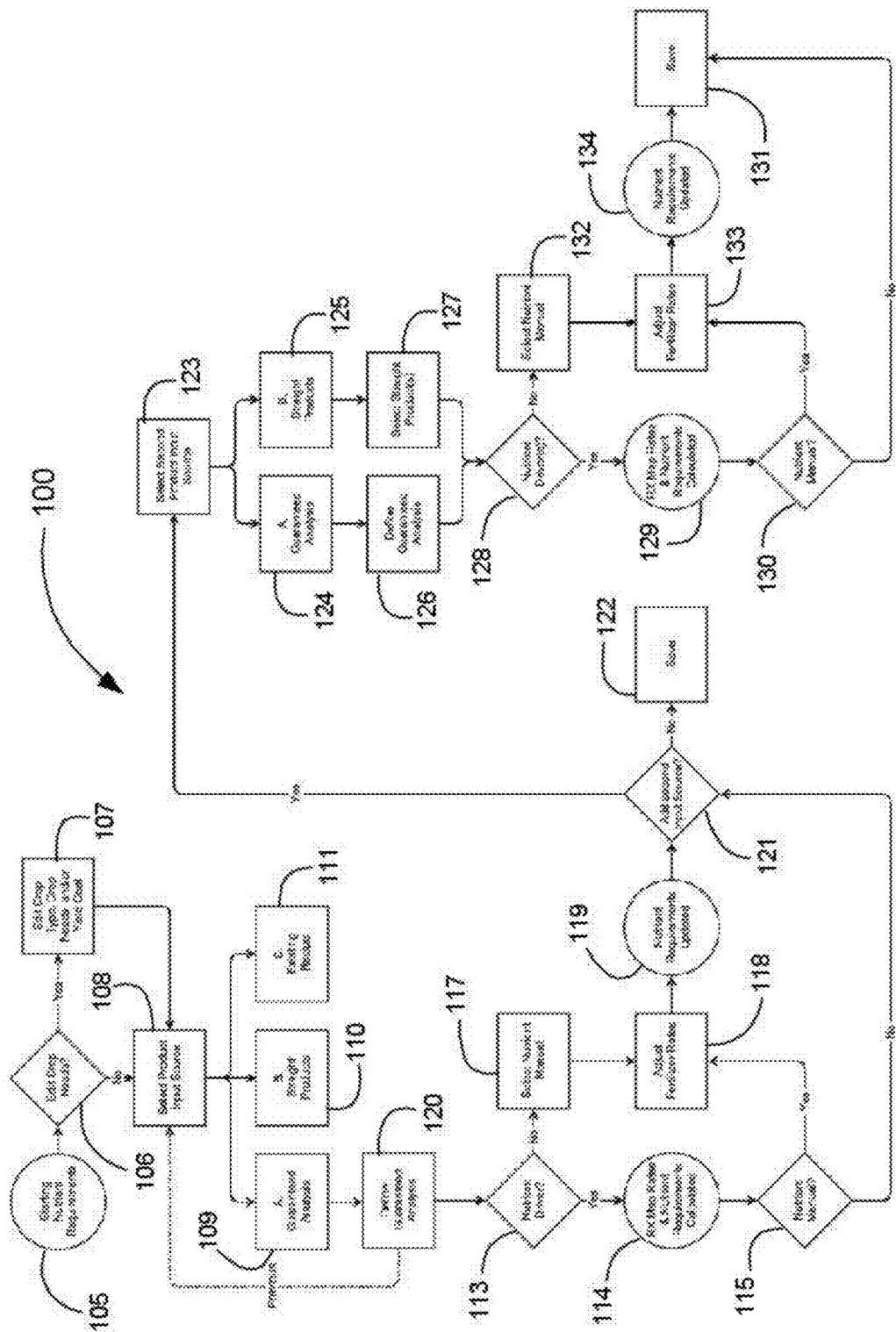
FIG. 4 is a diagrammatic illustration of an exemplary Agronomic Calculator method disclosed herein, used for creation of an agronomic prescription for application of a blended fertilizer product to a selected crop on a selected field, based on a guaranteed nutrient analysis.

Example 4. Use of the Agronomic Calculator to Create an Agronomic Prescription that Uses One Guaranteed Analysis An agronomist may use an example of the Agronomic Calculator 100 to create an agronomic prescription based on a guaranteed analysis for delivery of a blended fertilizer product to a selected crop on a selected field by generally following a process illustrated in FIG. 4. First, the agronomist uses an interface control of the Agronomy Calculator to create a new agronomic prescription. Then, the agronomist may review for a producer's field location, the information input by the producer pertaining to the starting fertility information 105 for the field and the geospatial zones therein, the selected crop type and related nutritional needs 107, and any edits to the crop needs 106 input by the producer. The agronomist then would enter the "select production input source" 108 and would select the "A. Guaranteed Analysis" 109 option. For each nutrient (i.e., N, P, K), the agronomist would then enter a blend ratio 120. It should be noted that blend ratios are based on combinations of straight N fertilizer products and/or straight P fertilizer products and/or straight K fertilizer products. The agronomist may optionally select at this step to include in the guaranteed analysis 120, one or more micronutrients or alternatively a blend of micronutrients. In this example, the agronomist selects from the N "Function" menu in the nitrogen column "N", "Driver" 113, as it is desirable that the N component of the previously defined guaranteed analysis drives calculation of the overall fertilizer rates 114 based on the definitions supplied by producer in the previous step (i.e., selection of the crop type, yield goal, crop needs, and field location). At the same time, the nutrient requirements associated with the crop needs are automatically updated 114. If the agronomist is satisfied with the agronomic prescription generated by the calculations 114 (i.e., the fertilizer rates calculated to satisfy the calculated nutrient requirements), they would proceed by selecting "Save" 122 to save the agronomic prescription. However, if the agronomist is not satisfied with the agronomic prescription generated by the Agronomic Calculator, they would select "Nutrient Manual?" 117 and manually adjust the fertilizer rates 118, after which, the Agronomic Calculator would recalculate the fertilizer rates and nutrient requirements 119, after which, the agronomist would "Save" 122 the agronomic prescription.

The Agronomist has the option to add a second input source 123 for the prescription being prepared by selecting "Add second input source" 121. For example, the second input source may be a "A. Guaranteed Analysis" 124 option or a "B. Straight Products" 125 option. If the agronomist chooses the "A. Guaranteed Analysis" 124 option, they would then specify the components and their ratios in the "Define Guaranteed Analysis" input 126, and then proceed by selecting from the N "Function" menu in the nitrogen column "N", "Driver" 128, as it is desirable that the N component of the previously defined guaranteed analysis drives calculation of the overall fertilizer rates 129 based on the definitions supplied by producer in their selection of the crop type, yield goal, crop needs, and field location at the start of the agronomic prescription development (items 105, 106, 107). If the agronomist is satisfied with the agronomic prescription generated by the calculations 129 (i.e., the fertilizer rates calculated to satisfy the calculated nutrient requirements), they would proceed to "Save" 131 the agronomic prescription. However, if the agronomist was not satisfied with the agronomic prescription generated by the Agronomic Calculator, they would select "Nutrient Manual?" query 130 and manually adjust the fertilizer rates 133, after which, the Agronomic Calculator would recalculate the fertilizer rates and nutrient requirements 134, after which, the agronomist would "Save" 131 the agronomic prescription.

Figure 5:
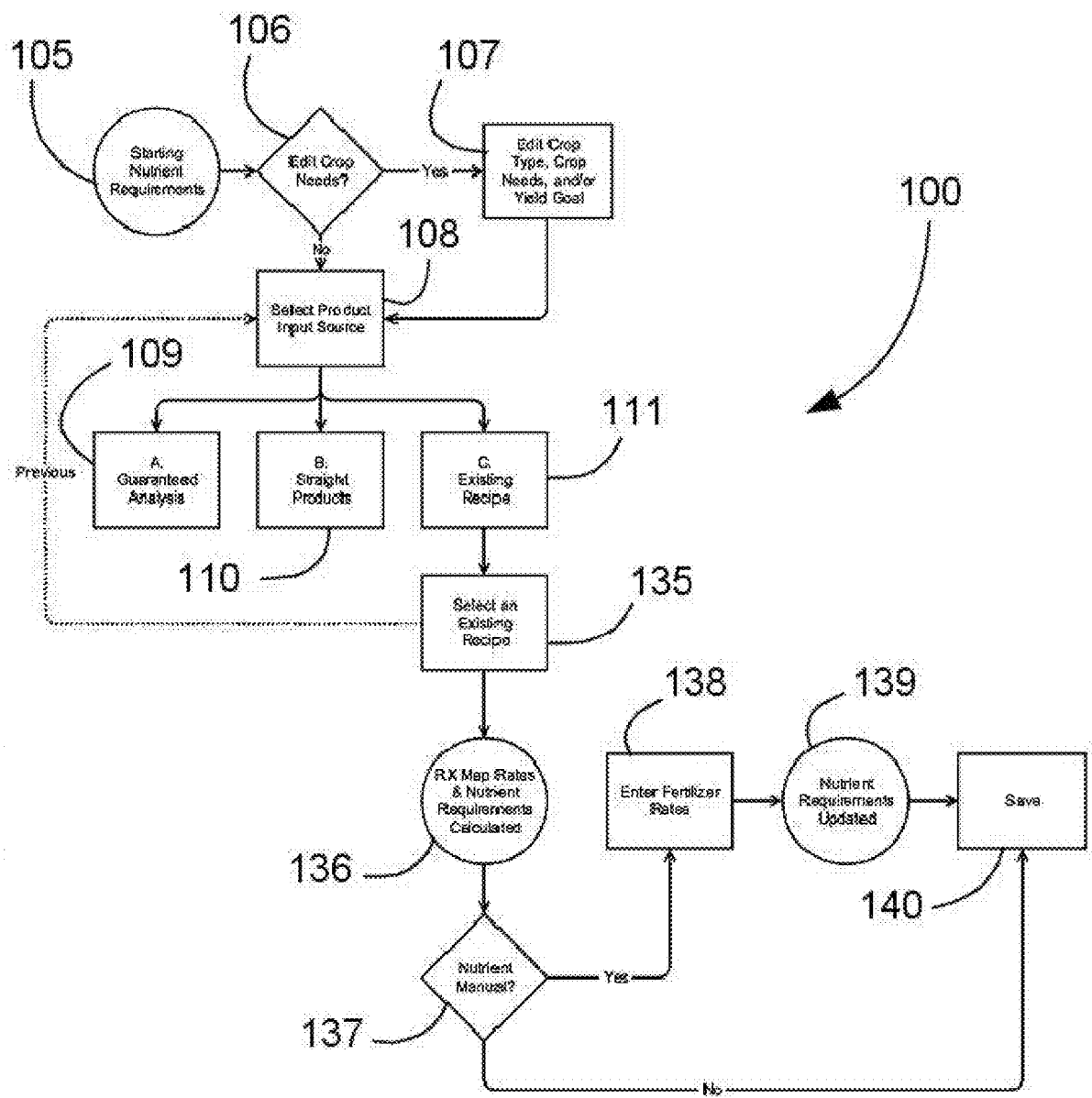
FIG. 5 is a diagrammatic illustration of an exemplary Agronomic Calculator method disclosed herein, used for creation of a new agronomic prescription by modifying an existing agronomic prescription.

Example 5. Use of the Agronomic Calculator to Create an Agronomic Prescription that Uses an Existing Nutrient Recipe This example is based on the premise that the agronomist has previously created at least one agronomic prescription for the producer, and has selected for creation of a new agronomic prescription, a specified field in the producer's database for which have been previously entered (i) a crop plan that includes at least a crop type, the number of farmable acres, and the crop yield goal, and (ii) soil test results. In this example, as illustrated in FIG. 5, the first step is for the agronomist to use the interface control of the Agronomy Calculator 100 to create a new agronomic prescription. The agronomist then reviews the producer's predefined crop type, crop needs, and the crop yield goal 107 for the field and soil management zones therein, and updates as needed for the the starting nutrient requirements 105 and crop needs 106 based on the most recent soil test results. The agronomist then would enter the "select production input source" 108 and select the "C. Existing Recipe" 111 option, and then would choose an existing recipe 135.

The fertilizer rates are then automatically updated 136, based on the definitions supplied by producer in the previous step (i.e., 107) and the agronomist (i.e., 105, 106, 108). At the same time, the nutrient requirements associated with the crop needs are automatically updated 136. If the agronomist is satisfied with the agronomic prescription generated by the calculations 136 (i.e., the fertilizer rates calculated to satisfy the calculated nutrient requirements), they would proceed by selecting "Save" 140 to save the agronomic prescription. However, if the agronomist was not satisfied with the agronomic prescription generated by the Agronomic Calculator at 136, they would select "Nutrient Manual?" query 137 and manually adjust the fertilizer rates 138, after which, the Agronomic Calculator would recalculate the fertilizer rates and nutrient requirements 139, after which, the agronomist would click "Save" 140 to save the agronomic prescription.

Example 6. Use of the Scouting Task Module by a Service Provider to Record an in-Season Crop Performance Assessment Event in a Selected Field This example is based on the premise that an agronomist under contract to a producer to perform in-season regularly scheduled scouting of a crop's growth and performance on a selected field, and to detect the occurrence of any crop diseases or pests.

Figure 6:
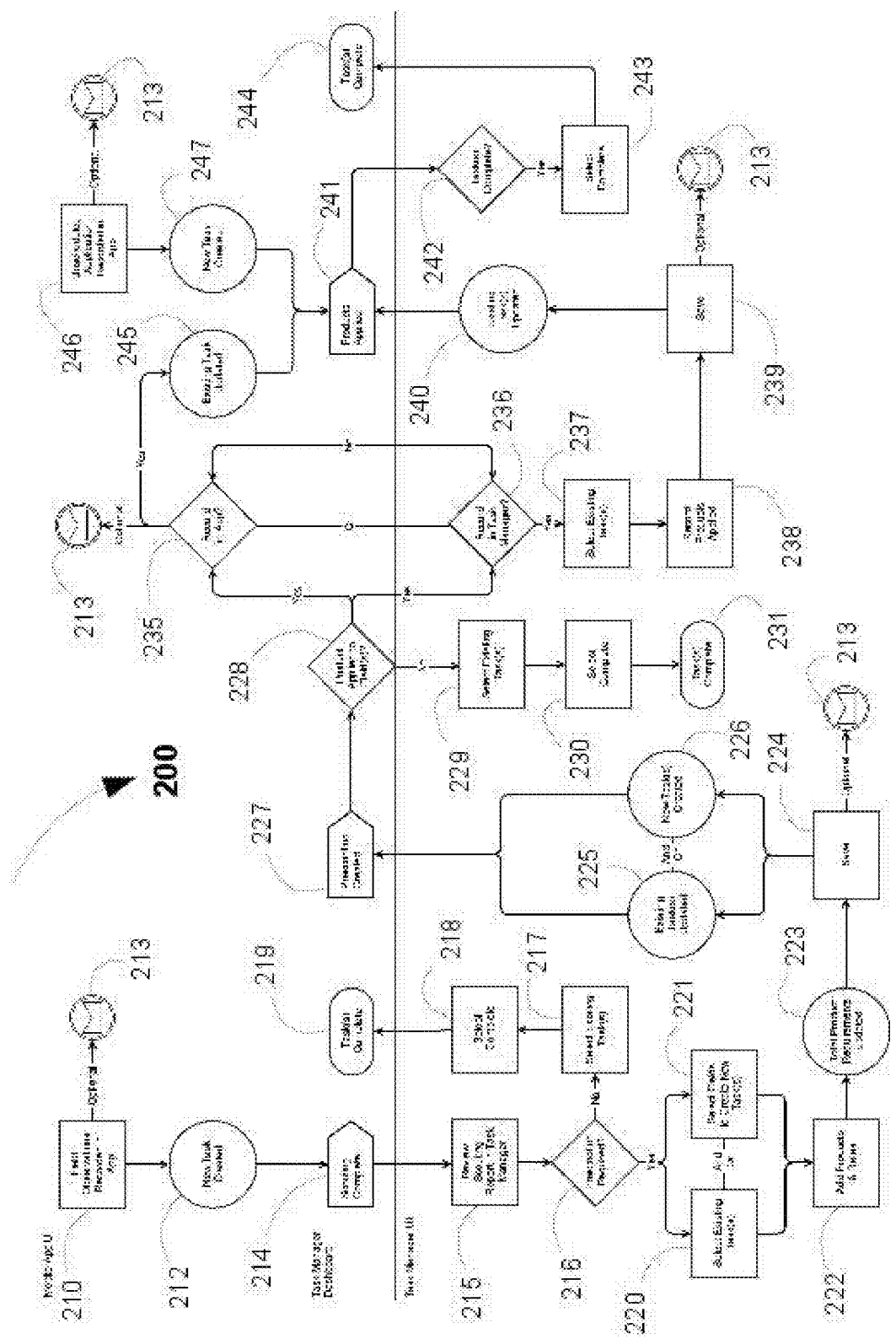
FIG. 6 is a diagrammatic illustration of an exemplary Scouting Task module according to another embodiment of the present disclosure.

In reference to FIG. 6, the agronomist would have input their observations into the Scouting app installed on a hand-held electronic device 210 (e.g., a tablet) thereby generating a scouting report 212 (shown as a new task in the Scouting Task module 200). The scouting report is uploaded into the Scouting Task module 200 component of the present agricultural enterprise management system (it is to be understood that the Scouting app is one of the productivity apps 23 shown in FIGS. 1 and 2) and the dashboard of agricultural enterprise management system will show that the scouting task has been completed 214. In this example, crop growth and development were considered to be normal and on schedule with no evidence of disease or pests. Accordingly, the agronomist would have entered that a new agronomic prescription or alternatively, an agronomic prescription modification was not required 215, 216 after which, the Scouting Task module would process that the existing task (i.e., the scouting event) had been completed 217, 218 and would appear on the dashboard of agricultural enterprise management system as a uniquely identified and verifiable completed task 219. It should be noted that it was optional for the agronomist, in this example, to email 213 a copy of their scouting observations directly to the producer and/or other users with requisite permissions from the agronomist's hand-held device.

Example 7. Use of the Scouting Task Module by a Service Provider to Create an Agronomic Prescription from an in-Season Crop Performance Assessment Event Recorded by a Producer in a Selected Field This example is based on the premise that a producer performed an in-season scouting assessment of one of their fields and noted two issues of concern in their crop. First, the overall growth and development of the crop across the entire field appeared to be lagging compared to crops grown in adjacent fields. Second, the producer observed an insect pest in several isolated locations within the filed.

The producer would have input their observations into the Scouting app installed on their hand-held electronic device 210 (e.g., a tablet) thereby generating a scouting report 212 that was uploaded into the present agricultural enterprise management system (shown as a new task in the Scouting Task Module 200), and the dashboard of agricultural enterprise management system will show that the scouting task has been completed 214. The producer would have elected to deliver an email notification 213 to their service provider (e.g., an agronomist) that a scouting report had been uploaded to the the present agricultural enterprise management system. The agronomist would then review 215 the scouting report input 216 and based on the report contents, determine if an agronomic prescription is required.

If it is determined that a agronomic prescription is required, the agronomist would first select the task(s) reviewed. The agronomist may optionally include additional fields in the prescription 221 by selecting from a menu of available fields, which will result in a new task being created for each of the appended fields. Second, the agronomist would select products for inclusion in the agronomic prescription and specify (i) the increased rate of application for each pesticide, and (ii) the rate of application for the pesticide 222. Based on the acreage of all fields included in the agronomic prescription, the total product requirements are calculated for each product included in the agronomic prescription 223. Upon saving the agronomic prescription 224, the phase of existing tasks are updated 225, and new tasks are created for any fields that were appended to the agronomic prescription 226, with both new and existing tasks being associated the new agronomic prescription 227.

The next step would be the actual pesticide application event 228, which may be recorded in the Scouting app installed on their hand-held electronic device by any user with the requisite permissions 235 (notification of select recipients optional 213), resulting in the updating of the task associated to the application event record. Alternatively, a scheduled pesticide application event may be recorded in the agricultural enterprise management system Scouting Task Module 236 by selecting from eligible tasks (i.e. those tasks with an application event scheduled) 237. In this case, the prescribed products, rates, and fields included in the original agronomic prescription are displayed as default, allowing the producer to adjust fields, products, and rates according to actual application events 238, and then save the application record(s) 239, thereby updating all associated tasks 240 (notification of select recipients optional 213). Alternatively, an application event may also be recorded in the Scouting app outside of the regular task workflow 247, resulting in a new task being created for the associated field (notification of select recipients optional 213). In all cases, when a application event is recorded and Saved, the corresponding task is updated to "Products Applied" in the Scouting Task Module 241.

The next step involves the producer reviewing all tasks that have a status of "Products Applied" in order to verify and confirm satisfactory completion 242. Tasks may be individually marked as complete in the corresponding task report, or selected as a group in the Scouting Task module and then marked "Complete" 243, resulting in the status of all selected tasks being updated to "Complete" 244 in the Scouting Tasks Module. It should be noted that the producer may indicate completion of one or more tasks, regardless of the current and possibly varying status of selected tasks (e.g. following Scouting, Prescriptions, or Products Applied).

The invention claimed is:

1. A computer-implemented method for management of an agricultural enterprise comprising the steps for:
    (a) collecting and inputting into one or more cloud-based databases and being processed by a first data processing module for each individual agricultural field selected from an agricultural producer's farmlands, a set of historical annual plurality of physicochemical data sets and a plurality of topographical data sets collected from a set of predetermined locations in each of selected individual agricultural fields comprising the farmlands, and a set of current annual plurality of physicochemical data sets and a plurality of topographical data sets for each of said selected individual agricultural fields;
    (b) obtaining and inputting into one or more cloud-based databases and being processed by a second data processing module for each selected individual agricultural field, a set of current annual pre-sowing crop production planning data records and crop selection data records, and optionally, a set of historical annual pre-sowing crop production planning data records and crop selection data records;
    (c) obtaining and inputting into one or more cloud-based databases and being processed by a third data processing module for each selected individual agricultural field, a set of historical annual crop production data records, said production data records including identification of the crop produced, crop growth rate data, harvested crop biomass yield data and/or harvested crop seed yield data, chemical fertilizer input data, pesticide input data, growth modulating product input data, and a set of current annual crop production data records;
    (d) obtaining and inputting into one or more cloud-based databases and being processed by a fourth data processing module for each selected individual agricultural field, a set of historical annual data set of agronomy service providers and cost data records listing each agronomy service delivered prior to and during each crop production cycle, and a set of current annual data set of agronomy service providers and cost data records;

(e) obtaining and inputting into one or more cloud-based databases and being processed by a fifth data processing module for each selected individual agricultural field, a set of historical annual data records listing harvested crop inventory records, sales records, and revenue records, and a set of current annual data records listing harvested crop inventory records, sales records, and revenue records;

(f) obtaining and inputting into one or more cloud-based databases and being processed by a sixth data processing module, data records pertaining to overhead expenditures incurred during one or more historical crop production cycle(s);

(g) automatically performing a computer-implemented analysis of the set of historical annual data and the set of current annual data for each of the data processing modules and producing therefrom one or more analysis summaries for each of said data processing modules;

(h) automatically creating with a computer-implemented program an agronomic prescription for each of two or more selected crops being considered for a next crop production cycle on a first selected field and generate therefrom, harvested crop yield projection, a crop production cost projection, and a return-on-investment revenue projection for each of the selected crops on the first selected field;

(i) automatically performing a computer-implemented analysis of the analysis summaries in reference to each of the crop production prescriptions for the first selected field, wherein the analysis provides a comparison of the harvested crop yield projection and the crop production cost projection for each of the two or more selected crops;

(j) repeating (1) the creation of an agronomic prescription, a harvested crop yield projection and a crop production cost projection for each of two or more selected crops being considered for a next crop production cycle on a second selected field, and (2) the computer-implemented analysis of the analysis summaries in reference to each of the agronomic prescriptions for the second selected field;

(k) from the inputted selections of a crop for the first selected field and a crop for a second selected field, generating with a computer-implemented program a work order comprising one or more of a supply of seed, a supply of fertility products, a supply of pesticides, performance of agronomic services, performance of equipment maintenance services, and performance of overhead services;

(l) electronically transmitting the work order over a network to one or more selected suppliers and/or one or more selected service providers pertaining to planting and growing of said selected crops;

(m) generating a series of alerts associated with the work order to enable tracking of delivery of the ordered products and/or services; and (n) generating a series of current status reports for each of the data processing modules, said current status reports electronically accessible by the producer and by an authorized and authenticated supplier or a service provider.

2. The computer-implemented method according to claim 1, additionally comprising obtaining from one or more third parties and inputting into a seventh data processing module, one or more of (1) a set of historical annual data and a set of current annual data pertaining to satellite imagery of one or more of the individual fields, (2) a set of historical annual data and a set of current annual data pertaining to weather data relating to the farmlands, (3) a set of historical annual data and a set of current annual data pertaining to industry financial data pertaining to seed prices, (4) a set of historical annual data and a set of current annual data pertaining to fertility product prices, (5) a set of historical annual data and a set of current annual data pertaining to pesticide prices, (6) a set of historical annual data and a set of current annual data pertaining to production contracts, (7) a set of historical annual data and a set of current annual data pertaining to agronomy services pricing, (8) a set of historical annual data and a set of current annual data pertaining to commodity prices and commodity futures prices, (9) a set of historical annual data and a set of current annual data pertaining to insurance pricing, and (10) a set of historical annual data and a set of current annual data pertaining to lenders' interests rates, and then performing steps (g) to (m).

3. The computer-implemented method according to claim 1, additionally comprising obtaining and inputting into an eighth data processing module, one or more of a set of historical annual financing of costs data and a set of current annual financing of costs data pertaining to (1) acquisition of the individual fields, (2) acquisition of capital equipment, (3) crop production, and (4) storage and delivery of harvested crops, and then performing steps (g) to (m).

4. The computer-implemented method according to claim 1, additionally comprising obtaining and inputting into a ninth data processing module, one or more of a set of historical annual data and a set of current annual data pertaining to (1) crop insurance costs, (2) property insurance costs, (3) equipment insurance costs, and (4) credit insurance costs, and then performing steps (g) to (m).

5. The computer-implemented method according to claim 1, additionally comprising obtaining and inputting into a tenth data processing module, one or more of a set of historical annual data and a set of current annual data pertaining to overhead costs associated with (1) land rental fees, (2) debt service fees, (3) line-of-credit fees, (4) electricity costs, (5) heating costs, (6) municipal water costs, (7) fuel, (8) building maintenance and repair costs, (9) equipment maintenance and repair costs, (10) book-keeping costs, (11) accounting costs, (12) taxes, (13) legal service costs, (14) travel costs, and (15) telecommunications and internet equipment and fees, and then performing steps (g) to (m).

6. The computer-implemented method according to claim 1, additionally comprising an agronomy calculator module comprising a workflow interface for a user to access and modify an agronomic prescription created for a selected crop on a selected field by specifying a change in (1) a type of a fertilizer product input, and (2) rate of the fertilizer product input.

7. The computer-implemented method according to claim 6, wherein the type of the fertilizer product input is one of a straight fertilizer product, a guaranteed analysis, and an existing agronomic prescription.

8. The computer-implemented method according to claim 7, wherein the fertilizer product input additionally comprises one or more micronutrients.

9. The computer-implemented method according to claim 1, additionally comprising a scouting task module for receiving and processing in-season data inputs from a user for generation therefrom of reports and alerts pertaining to one or more of changes required to an agronomic prescription created for a selected crop on a selected field and a requirement for application agrichemical product application, wherein the in-season data inputs include one or more of (1) a crop growth and development assessment, (2) a detection of a presence of a plant pest, and (3) a detection of a plant disease.

10. The computer-implemented method according to claim 1, additionally comprising steps (o) and (p) inserted between steps (j) and (k) wherein:
   step (o) comprises producing for the first selected field, an output listing the two or more selected crops, a harvested crop yield projection and the crop production cost projection for each of the two or more selected crops, and an input section for the producer to input a crop selection from the two or more selected crops for the first selected field; and
   step (p) comprises producing for the second selected field, an output listing the two or more selected crops, a harvested crop yield projection and the crop production cost projection for each of the two or more selected crops, and an input section for the producer to input a crop selection from the two or more selected crops for the second selected field.

11. The computer-implemented method according to claim 1, comprising an additional first step (q) of making a first determination of whether a selected global weather event or a selected economic fluctuation will cause a reduction in one or more of a crop yield projection and a crop production cost projection for the first selected field, and if the first determination indicates that a reduction in the crop yield projection and/or the crop production cost projection will occur, modify the agronomic prescription to decrease the crop yield projection and/or the crop production cost projection for the first selected field; and
   additionally comprising a second step (r) after the first additional step (q) of making a second determination whether a global weather event or an economic fluctuation will cause a reduction in one or more of a crop yield projection and a crop production cost projection, and if the second determination indicates that a reduction in the crop yield projection and/or the crop production cost projection will occur, modify the agronomic prescription to decrease the crop yield projection and/or the crop production cost projection for the second selected field.

12. A computer system for management of an agricultural enterprise comprising:
   a memory;
   one or more cloud-based databases;
   a network or a communication connection;
   a processor coupled to the memory, the one or more cloud-based databases, and the network or the communication connection;
   wherein the processor, the memory, the one or more cloud-based databases, and the network or the communication connection form a single computerized platform for:
   (a) collecting and inputting into one or more cloud-based databases and being processed by a first data processing module for each individual agricultural field selected from an agricultural producer's farmlands, a set of historical annual plurality of physicochemical data sets and a plurality of topographical data sets collected from a set of predetermined locations in each of selected individual agricultural fields comprising the farmlands, and a set of current annual plurality of physicochemical data sets and a plurality of topographical data sets for each of said selected individual agricultural fields;
   (b) obtaining and inputting into one or more cloud-based databases and being processed by a second data processing module for each selected individual agricultural field, a set of current annual pre-sowing crop production planning data records and crop selection data records, and optionally, a set of historical annual pre-sowing crop production planning data records and crop selection data records;
   (c) obtaining and inputting into one or more cloud-based databases and being processed by a third data processing module for each selected individual agricultural field, a set of historical annual crop production data records, said production data records including identification of the crop produced, crop growth rate data, harvested crop biomass yield data and/or harvested crop seed yield data, chemical fertilizer input data, pesticide input data, growth modulating product input data, and a set of current annual crop production data records;
   (d) obtaining and inputting into one or more cloud-based databases and being processed by a fourth data processing module for each selected individual agricultural field, a set of historical annual data set of agronomy service providers and cost data records listing each agronomy service delivered prior to and during each crop production cycle, and a set of current annual data set of agronomy service providers and cost data records;
   (e) obtaining and inputting into one or more cloud-based databases and being processed by a fifth data processing module for each selected individual agricultural field, a set of historical annual data records listing harvested crop inventory records, sales records, and revenue records, and a set of current annual data records listing harvested crop inventory records, sales records, and revenue records;
   (f) obtaining and inputting into one or more cloud-based databases and being processed by a sixth data processing module, data records pertaining to overhead expenditures incurred during one or more historical crop production cycle(s);
   (g) automatically performing a computer-implemented analysis of the set of historical annual data and the set of current annual data for each of the data processing modules and producing therefrom one or more analysis summaries for each of said data processing modules;
   (h) automatically creating with a computer-implemented program an agronomic prescription for each of two or more selected crops being considered for a next crop production cycle on a first selected field and generate therefrom, harvested crop yield projection, a crop production cost projection, and a return-on-investment revenue projection for each of the selected crops on the first selected field;
   (i) automatically performing a computer-implemented analysis of the analysis summaries in reference to each of the crop production prescriptions for the first selected field wherein the analysis provides a comparison of the harvested crop yield projection and the crop production cost projection for each of the two or more selected crops;
   (j) repeating (1) the creation of an agronomic prescription, a harvested crop yield projection and a crop production cost projection for each of two or more selected crops being considered for a next crop production cycle on a second selected field, and (2) the computer-implemented analysis of the analysis summaries in reference to each of the agronomic prescriptions for the second selected field;

(k) from the inputted selections of a crop for the first selected field and a crop for a second selected field, generating with a computer-implemented program a work order comprising one or more of a supply of seed, a supply of fertility products, a supply of pesticides, performance of agronomic services, performance of equipment maintenance services, and performance of overhead services;

(l) electronically transmitting the work order over a network to one or more selected suppliers and/or one or more selected service providers pertaining to planting and growing of said selected crops;

(m) generating a series of alerts associated with the work order to enable tracking of delivery of the ordered products and/or services; and (n) generating a series of current status reports for each of the data processing modules, said current status reports electronically accessible by the producer and by an authorized and authenticated supplier or a service provider.

13. A computer-readable storage device comprising computer-executable instructions for management of an agricultural enterprise, wherein the instructions, when executed, cause a processor to perform actions comprising: executing in a memory of a single computerized platform, (a) collecting and inputting into one or more cloud-based databases and being processed by a first data processing module for each individual agricultural field selected from an agricultural producer's farmlands, a set of historical annual plurality of physicochemical data sets and a plurality of topographical data sets collected from a set of predetermined locations in each of selected individual agricultural fields comprising the farmlands, and a set of current annual plurality of physicochemical data sets and a plurality of topographical data sets for each of said selected individual agricultural fields;

(b) obtaining and inputting into one or more cloud-based databases and being processed by a second data processing module for each selected individual agricultural field, a set of current annual pre-sowing crop production planning data records and crop selection data records, and optionally, a set of historical annual pre-sowing crop production planning data records and crop selection data records;

(c) obtaining and inputting into one or more cloud-based databases and being processed by a third data processing module for each selected individual agricultural field, a set of historical annual crop production data records, said production data records including identification of the crop produced, crop growth rate data, harvested crop biomass yield data and/or harvested crop seed yield data, chemical fertilizer input data, pesticide input data, growth modulating product input data, and a set of current annual crop production data records;

(d) obtaining and inputting into one or more cloud-based databases and being processed by a fourth data processing module for each selected individual agricultural field, a set of historical annual data set of agronomy service providers and cost data records listing each agronomy service delivered prior to and during each crop production cycle, and a set of current annual data set of agronomy service providers and cost data records;

(e) obtaining and inputting into one or more cloud-based databases and being processed by a fifth data processing module for each selected individual agricultural field, a set of historical annual data records listing harvested crop inventory records, sales records, and revenue records, and a set of current annual data records listing harvested crop inventory records, sales records, and revenue records;

(f) obtaining and inputting into one or more cloud-based databases and being processed by a sixth data processing module, data records pertaining to overhead expenditures incurred during one or more historical crop production cycle(s);

(g) automatically performing a computer-implemented analysis of the set of historical annual data and the set of current annual data for each of the data processing modules and producing therefrom one or more analysis summaries for each of said data processing modules;

(h) automatically creating with a computer-implemented program an agronomic prescription for each of two or more selected crops being considered for a next crop production cycle on a first selected field and generate therefrom, harvested crop yield projection, a crop production cost projection, and a return-on-investment revenue projection for each of the selected crops on the first selected field;

(i) automatically performing a computer-implemented analysis of the analysis summaries in reference to each of the crop production prescriptions for the first selected field wherein the analysis provides a comparison of the harvested crop yield projection and the crop production cost projection for each of the two or more selected crops;

(j) repeating (1) the creation of an agronomic prescription, a harvested crop yield projection and a crop production cost projection for each of two or more selected crops being considered for a next crop production cycle on a second selected field, and (2) the computer-implemented analysis of the analysis summaries in reference to each of the agronomic prescriptions for the second selected field;

(k) from the inputted selections of a crop for the first selected field and a crop for a second selected field, generating with a computer-implemented program a work order comprising one or more of a supply of seed, a supply of fertility products, a supply of pesticides, performance of agronomic services, performance of equipment maintenance services, and performance of overhead services;

(l) electronically transmitting the work order over a network to one or more selected suppliers and/or one or more selected service providers pertaining to planting and growing of said selected crops;

(m) generating a series of alerts associated with the work order to enable tracking of delivery of the ordered products and/or services; and (n) generating a series of current status reports for each of the data processing modules, said current status reports electronically accessible by the producer and by an authorized and authenticated supplier or a service provider.

14. The computer-readable storage device of claim 13, wherein said instructions, when executed, further cause the processor to perform actions comprising processing additional steps (o) and (p) inserted between steps (j) and (k) wherein:
- step (o) comprises producing for the first selected field, an output listing the two or more selected crops, a harvested crop yield projection and the crop production cost projection for each of the two or more selected crops, and an input section for the producer to input a crop selection from the two or more selected crops for the first selected field; and
- step (p) comprises producing for the second selected field, an output listing the two or more selected crops, a harvested crop yield projection and the crop production cost projection for each of the two or more selected crops, and an input section for the producer to input a crop selection from the two or more selected crops for the second selected field.

15. The computer-readable storage device of claim 13, wherein said instructions, when executed, further cause the processor to perform actions comprising:
- (q) making a first determination of whether a selected global weather event or a selected economic fluctuation will cause a reduction in one or more of a crop yield projection and a crop production cost projection for the first selected field, and if the first determination indicates that a reduction in the crop yield projection and/or the crop production cost projection will occur, modify the agronomic prescription to decrease the crop yield projection and/or the crop production cost projection for the first selected field; and
- (r) after the first additional step (q), making a second determination whether a global weather event or an economic fluctuation will cause a reduction in one or more of a crop yield projection and a crop production cost projection, and if the second determination indicates that a reduction in the crop yield projection and/or the crop production cost projection will occur, modify the agronomic prescription to decrease the crop yield projection and/or the crop production cost projection for the second selected field.

16. The computer-readable storage device of claim 13, wherein said instructions, when executed, further cause the processor to perform actions comprising:
obtaining from one or more third parties and inputting into a seventh data processing module, one or more of (1) a set of historical annual data and a set of current annual data pertaining to satellite imagery of one or more of the individual fields, (2) a set of historical annual data and a set of current annual data pertaining to weather data relating to the farmlands, (3) a set of historical annual data and a set of current annual data pertaining to industry financial data pertaining to seed prices, (4) a set of historical annual data and a set of current annual data pertaining to fertility product prices, (5) a set of historical annual data and a set of current annual data pertaining to pesticide prices, (6) a set of historical annual data and a set of current annual data pertaining to production contracts, (7) a set of historical annual data and a set of current annual data pertaining to agronomy services pricing, (8) a set of historical annual data and a set of current annual data pertaining to commodity prices and commodity futures prices, (9) a set of historical annual data and a set of current annual data pertaining to insurance pricing, and (10) a set of historical annual data and a set of current annual data pertaining to lenders' interests rates, and then performing steps (g) to (m).

17. The computer-readable storage device of claim 13, wherein said instructions, when executed, further cause the processor to perform actions comprising:
obtaining and inputting into an eighth data processing module, one or more of a set of historical annual financing of costs data and a set of current annual financing of costs data pertaining to (1) acquisition of the individual fields, (2) acquisition of capital equipment, (3) crop production, and (4) storage and delivery of harvested crops, and then
performing steps (g) to (m).

18. The computer-readable storage device of claim 13, wherein said instructions, when executed, further cause the processor to perform actions comprising:
obtaining and inputting into a ninth data processing module, one or more of a set of historical annual data and a set of current annual data pertaining to (1) crop insurance costs, (2) property insurance costs, (3) equipment insurance costs, and (4) credit insurance costs, and then
performing steps (g) to (m).

19. The computer-readable storage device of claim 13, wherein said instructions, when executed, further cause the processor to perform actions comprising:
obtaining and inputting into a tenth data processing module, one or more of a set of historical annual data and a set of current annual data pertaining to overhead costs associated with (1) land rental fees, (2) debt service fees, (3) line-of-credit fees, (4) electricity costs, (5) heating costs, (6) municipal water costs, (7) fuel, (8) building maintenance and repair costs, (9) equipment maintenance and repair costs, (10) book-keeping costs, (11) accounting costs, (12) taxes, (13) legal service costs, (14) travel costs, and (15) telecommunications and internet equipment and fees, and then
performing steps (g) to (m).

20. The computer-readable storage device of claim 13, wherein said instructions, when executed, further cause the processor to perform actions comprising:
allowing, through a workflow interface of an agronomy calculator module, a user to access and modify an agronomic prescription created for a selected crop on a selected field by specifying a change in (1) a type of a fertilizer product input, and (2) rate of the fertilizer product input.

* * * * *